United States Patent [19]
Wedeniwski

[11] Patent Number: 5,984,820
[45] Date of Patent: Nov. 16, 1999

[54] MOTOR VEHICLE TRANSMISSION HAVING A CONTINUOUSLY VARIABLE TRANSMISSION RATIO

[76] Inventor: Horst Josef Wedeniwski, Beutelsbacherstrasse 8/1, D-73630 Remshalden, Germany

[21] Appl. No.: 09/051,992
[22] PCT Filed: Oct. 23, 1996
[86] PCT No.: PCT/EP96/04604
§ 371 Date: Aug. 24, 1998
§ 102(e) Date: Aug. 24, 1998
[87] PCT Pub. No.: WO97/15766
PCT Pub. Date: May 1, 1997

[30] Foreign Application Priority Data

Oct. 26, 1995 [DE] Germany .................. 195 39 776

[51] Int. Cl.⁶ .................. F16H 37/08; F16H 15/52
[52] U.S. Cl. .................. 475/193; 475/215
[58] Field of Search .................. 475/215, 214, 475/217, 182, 183, 185, 193

[56] References Cited

U.S. PATENT DOCUMENTS

| | | | |
|---|---|---|---|
| 1,762,199 | 6/1930 | Standish | 475/193 |
| 2,027,710 | 1/1936 | Stewart | 475/193 |
| 2,062,901 | 12/1936 | Graham | 475/193 |
| 2,178,859 | 11/1939 | Jett . | |
| 2,353,136 | 7/1944 | Bade . | |
| 2,706,916 | 4/1955 | Graham | 475/193 |
| 2,836,994 | 6/1958 | Weber . | |
| 3,349,642 | 10/1967 | Alsch | 475/193 |
| 3,969,957 | 7/1976 | DeLalia . | |
| 4,680,985 | 7/1987 | Troester | 475/3 X |
| 4,856,371 | 8/1989 | Kemper | 475/215 |
| 5,545,101 | 8/1996 | Kawase et al. | 475/215 X |

FOREIGN PATENT DOCUMENTS

| | | |
|---|---|---|
| 0149892B1 | 3/1990 | European Pat. Off. . |
| 0560840B1 | 1/1996 | European Pat. Off. . |
| 59-001862 | 1/1984 | Japan . |
| 2173469 | 7/1990 | Japan . |
| 0324959 | 11/1991 | Japan . |

OTHER PUBLICATIONS

G. Niemann, H. Winter, Maschinen–elemente, 1986, pp. 192, 193, Tokyo.
G.B. Soar, C.J. Greenwood, 4.Aachener Kolloquium, Fahrzeug–und Motorentechnik, 1993, pp. 607–622.

*Primary Examiner*—Dirk Wright
*Attorney, Agent, or Firm*—William B. Kircher; Shook, Hardy & Bacon LLP

[57] ABSTRACT

A motor vehicle gearbox with an infinitely variable reduction ratio comprises an input shaft, an output shaft, a first gear stage with a continuously adjustable reduction ratio, and a second gear stage in the form of a summarizing gear. The input shaft is connected to the input of the first gear stage and, via a first coupling, to a first input of the second gear stage. The output of the first gear stage is connected to a second input of the second gear stage and, via a second coupling, to the output shaft, which simultaneously forms the output of the second gear stage. The first gear stage is part of a main gear. The main gear and the second gear stage are disposed coaxially relative to each other and to a common main axis. The first gear stage takes the form of a frictional body gear, in particular a frictional wheel epicyclic gear, in which two bodies abut each other in a frictionally engaging manner in a region. The frictional bodies rotate over the entire reduction range at a higher speed ($n_3$) than the drive speed ($n_1$).

101 Claims, 5 Drawing Sheets

MOTOR VEHICLE TRANSMISSION HAVING A CONTINUOUSLY VARIABLE TRANSMISSION RATIO

BACKGROUND OF THE INVENTION

The invention relates to a motor vehicle transmission having a continuously variable transmission ratio and comprising a transmission input shaft, a first input shaft, a transmission output shaft, a first transmission stage with continuously variable transmission ratio and a second transmission stage configured as a summing transmission, the transmission input shaft being connected on the one hand side with the input of the first transmission stage and on the other hand side via a first clutch with a first input of the second transmission stage, the output of the first transmission stage, further, being connected on the one hand side with a second input of the second transmission stage and, on the other hand side via a second clutch with the transmission output shaft constituting also the output of the second transmission stage, the first transmission stage being, particularly, configured as a friction wheel epicyclic transmission in which two bodies contact each other in an area. The invention is particularly related to such transmissions in which by switching two clutches two modes of operation may be set being characterized by a synchronous transition.

A transmission of the afore-mentioned kind is disclosed in a conference report "4. Aachener Kolloquium, Fahrzeug- und Motor-entechnik '93", pages 607–622. The transmission in question has become well-known in the art under the manufacturer's denomination "TOROTRAK".

In a "TOROTRAK" transmission two toroidal frictional bodies, so-called globoides are arranged non-rotationally on an input shaft. Between the two toroidal frictional bodies a toothed disk of a toothed chain is arranged rotationally which, at its two radial outer surfaces is also configured as a toroidal frictional body. Between the two opposing toroidal frictional surfaces of the non-rotational and the rotational toroidal frictional bodies, respectively, frictional transmission bodies are arranged at a distance from the axis which contact the two frictional surfaces of the toroidal frictional bodies. By tilting these frictional transmission bodies relative to the direction of the axis, the contact point on the respective toroidal frictional bodies may be adjusted in a radial direction so that a continuously variable transmission ratio is achieved. The toothed disk, therefore, rotates at a speed which may be adjusted continuously with respect to the speed of the input shaft. The transmission ratio may be varied between 2.0 and 0.5, corresponding to a gear ratio spread of 4. The transmission may be operated in a certain range (i<1) such that the speed is converted into faster speeds. Transmission ratios being smaller than 0.5 may not be achieved due to the specific design of that transmission because the frictional transmission bodies would have to be arranged to steep with respect to the direction of the axis.

An output shaft is arranged parallel to the input shaft. The output shaft has two axially neighbored hollow shaft sections, a first of which supporting the second pulley of the chain drive as well as the sun gear wheel of a planetary gear set. The other hollow shaft section is connected with the arm of the planetary gear set whereas the ring gear wheel is connected to the output shaft extending through the two hollow shaft sections.

The first hollow shaft section is adapted to be connected with the output shaft via a first clutch, whereas the second hollow shaft section is adapted to be connected to a toothed wheel via a second clutch, the toothed wheel meshing with a corresponding fixed wheel on the transmission input shaft via a fixed transmission ratio.

In a first mode of operation the first clutch is closed and the second clutch is opened. Hence, the variator drives the sun gear wheel and the input shaft drives the arm of the planetary gear set via the fixed transmission, the planetary gear set, in this instance, acting as a summing gear. The output of the planetary gear train, i.e. the ring gear wheel, drives the output shaft.

In a second mode of operation the first clutch is opened and the second clutch is closed so that the first hollow shaft section is non-rotationally connected to the output shaft. Accordingly, the variator directly drives the output shaft.

In this way the first mode of operation allows low output speeds with high torque. The high torque is essentially transmitted via the fixedly toothed path of the flow of torque via the second clutch. In the second mode of operation, however, high output speeds are possible, while the lower torque (at same power) is transmitted via the high variator speeds directly onto the output shaft.

The "TOROTRAK" transmission, however, has some disadvantages. On the one hand side the variator is relatively complex in its design. This holds true in particular with respect to the design of the toroidal frictional bodies as well as of the frictional transmission bodies, including the relative control thereof as well as the maintaining of the frictional contact between the afore-mentioned elements over the entire transmission ratio range.

Another advantage of the afore-described "TOROTRAK" transmission is that due to the necessity of having two parallel shafts together with a chain drive therebetween, considerable dimensions of the transmission are necessary which are not acceptable in numerous applications of passenger vehicle transmissions.

EP-B1-0 560 840 discloses a modification of the afore-described "TOROTRAK" transmission. This prior art transmission, however, is only suited to be installed in a motor vehicle in a longitudinal direction due to its long axial design, however, it may not be installed transversely in the front section of the vehicle.

EP-B1 0 149 892 discloses a motor vehicle transmission having a continuously variable transmission ratio which is another modification of the above-explained "TOROTRAK" transmission.

This prior art transmission comprises a variator being identical in its design with the above-described variator having globoides. The modification consists in that the transmission is of coaxial design. The output shaft of the variator is designed as a hollow shaft and is arranged as an axial extension of the variator input shaft. These two shafts are each connected with the sun gear wheels of two planetary gear trains acting as a summing stage. The two planetary gear sets are arranged axially one after the other. In the planetary gear set being driven by the hollow output shaft of the variator and being switched into the flow of power only in the slow mode of operation, the arm may be held stationary on the transmission housing by means of a brake. In contrast, in the other planetary gear set being driven by the extended input shaft of the variator, the arm may be coupled with the hollow output shaft of the variator via a switchable clutch, wherein the arm concurrently drives the output shaft of the entire transmission.

In the fast mode of operation only the variator is switched into the flow of power and the two other planetary gear sets are functionally decoupled. Therefore, for this transmission two planetary gear sets of the described design are required for the function of the transmission stage being configured as a summing gear for the slow mode of operation.

JP-A-59 001 862 discloses a mechanical continuously variable transmission being of the type of a so-called Graham transmission. Two friction cones are journalled in a carrier, the carrier being driven by the transmission input shaft. The friction cone shafts are provided with a pinion on each of their free ends which, in turn, drive a ring gear wheel of a planetary gear train. The sun gear wheel of the planetary gear train is directly driven by the input shaft. The output of the transmission is connected to the arm of the planetary gear train.

This prior art transmission is, therefore, a purely continuously variable transmission without the possibility of switching between driving ranges with a mode of operation "load operation" on the one hand side and a mode of operation "direct operation" on the other hand side.

U.S. Pat. No. 2,353,136 discloses another motor vehicle transmission of the Graham type.

In this prior art transmission the input shaft is connected with a carrier for two rotating friction cones via a planetary inversion stage and is, further, directed through the friction cone arrangement. The output of the friction cone arrangement is configured as a hollow shaft being coaxial to the input shaft extending therethrough. These two shafts are input to a summing gear consisting of two cascaded planetary gear sets. In the first planetary gear set the variator output speed is converted and this converted speed is then added to the input speed in the second planetary gear train. The sum speed is the speed of the output shaft.

This transmission, too, is a one-range variator transmission without the possibility of switching between two operational ranges.

Another transmission with inclined frictional bodies is disclosed in JP-A-03 249 459.

SUMMARY OF THE INVENTION

It is, therefore, an object underlying the invention to provide a transmission of the kind mentioned at the outset such that for the first time a transmission having a continuously variable transmission ratio may be provided for applications in passenger motor vehicles which, on the one hand side, have very small dimensions and, on the other hand side, are capable of transmitting high powers, as is required in modern motor vehicle engineering.

According to a motor vehicle transmission as specified at the outset, this object is achieved, on the one hand side, in that the first transmission stage is a part of a main transmission, and that the main transmission and the second transmission stage are arranged coaxial to each other and coaxial relative to a common main axis.

The object underlying the invention is, further, achieved by a motor vehicle transmission of the kind specified at the outset in that the friction bodies rotate at a higher rotational speed as compared to the input rotational speed over the entire transmission ratio range.

The first transmission stage being an epicyclic friction wheel transmission is part of a main transmission. A first connection shaft thereof is connected to the transmission input shaft. A second connection shaft thereof (constant output) has a speed being independent of the transmission ratio of the first transmission stage. The third connection shaft (variable output), however, has a speed depending on the transmission ratio. The main transmission, the first transmission stage, the second transmission stage as well as the entire transmission as such are preferably arranged coaxially with respect to each other.

As an alternative, however, in particular for applications with transverse mounting in the front portion of the vehicle, the main transmission and the second transmission stage may be each designed coaxial in itself, however, being arranged on two parallel main axes.

As will be explained in more detail, the main transmission may be supplemented by further planetary gear trains for achieving various effects. The second transmission stage solely consists of a planetary gear train. All transmission stages of the main transmission are always switched into the flow of power.

As mentioned before, the first transmission stage is preferably designed as an epicyclic friction wheel transmission operating according to the frictional principle "cone on ring under hypocyclic movement". Within that principle a cone and a ring establish a rolling contact without any intermediate element. Therefore, the friction bodies rotate at higher speeds as the input speed over the entire transmission ratio range.

The object underlying the invention is thus entirely solved.

Due to the coaxial design of the transmission the dimensions are substantially reduced because there is only one main axis of the transmission left and not more two neighbored transmission shafts, an is the case in conventional frictional transmissions as have been used heretofore in motor vehicle engineering.

By letting the friction bodies rotate at higher speeds over the entire transmission ratio range, the transmitted torque (at the same transmitted power) is smaller at any time so that, seen as a whole, higher powers may be transmitted because torque is the limiting factor for friction transmission. The invention, insofar, uses a trick by increasing the speed in any operational point at that location within the transmission where the power transmission is effected via friction. As the amount of power transmission through frictional contact is limited by the shearing forces within the frictional area, a higher power may be transmitted at the same torque, if within the transmission just that frictional contact area is increased in its revolutional speed.

Insofar, one has to take into account that all conventional frictional wheel transmissions have (at least in certain ranges) a transmission "into slow", i.e. have transmission ratios in excess of 1.0. In contrast, the invention uses a transmission ratio being substantially below 1.0, preferably in a range of between 0.2 and 0.4. In the transmission according to the invention, the transmission ratio, hence, begins at a point where it ends in the "TOROTRAK" transmission.

In a preferred embodiment of the invention a third transmission stage operating as a reduction set and converting into slower speeds is arranged in front of the friction body transmission within the main transmission, the third transmission stage converting the input speed of the transmission into a lower intermediate speed.

This measure has the advantage that the speeds, seen as a whole, may be kept within a technically reasonable range if, for the reasons explained above, those transmission elements are operated at higher speeds which are in contact under friction for increasing the power to be transmitted. If the speeds have been lowered before, a speed range may be used which can be easily handled.

In the friction cones as used it is particularly preferred when the half taper angle is between 10° and 20°, preferably at 17°.

This design has the advantage that a particularly advantageous roller ratio (Bohr-Wälz-Verhältnis) is achieved (cf. German textbook "Niemann, Maschinenelemente, Band III", Springer-Verlag, pages 192–193, 1986).

Further advantages will become apparent from the description and the enclosed drawing.

It goes without saying that the afore-mentioned features and those that will be explained hereinafter, may not only be used in the particularly given combination, but also in other combinations or alone, without leaving the scope of the present invention.

DESCRIPTION OF THE DRAWINGS

Embodiments of the invention are shown in the drawing and will be explained in further detail throughout the subsequent description in which.

DESCRIPTION OF THE PREFERRED EMBODIMENT

Figure 1:
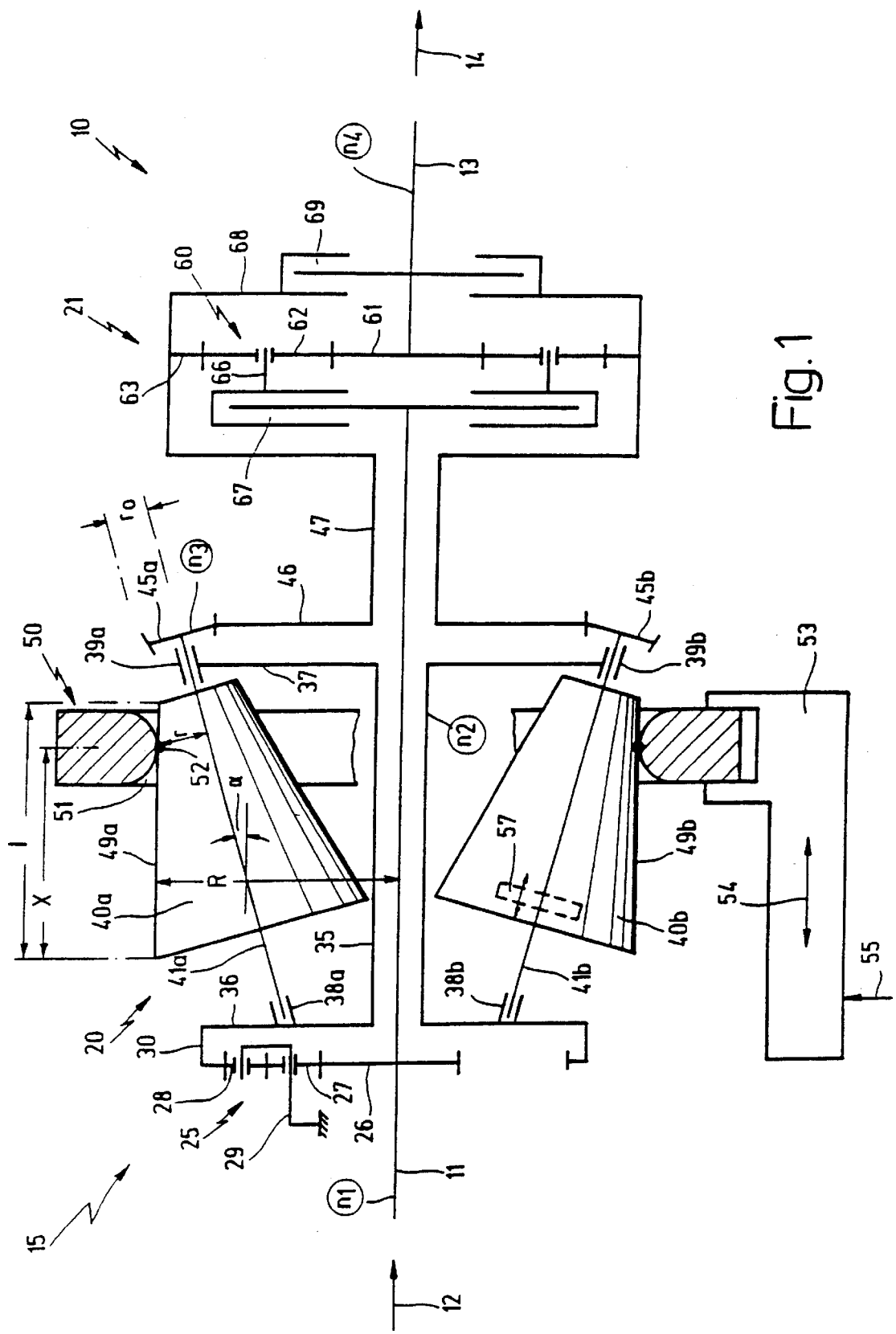
FIG. 1 is a schematic representation of a first embodiment of a transmission according to the invention.

In FIG. 1 reference numeral 10 as a whole designates a motor vehicle transmission having a continuously variable transmission ratio. Speaking in terms of transmission engineering, transmission 10 belongs to the group of adjustably coupled transmissions (Stellkoppelgetriebe).

Transmission 10 comprises an input shaft 11. Input power may be fed to input shaft 11, as indicated by an arrow 12. The revolutional speed of input shaft 11 is designated with $n_1$. An output shaft 13 may be seen at the transmission output. Output power may be taken from output shaft 13, as indicated by an arrow 14. The revolutional speed of output shaft 13 is indicated with $n_4$.

Transmission 10 comprises a main transmission 15. Main transmission 15, in turn, has a first transmission stage 20 with a continuously variable transmission ratio. Transmission 10, hence, is subdivided essentially into the main transmission 15 as well as a second transmission stage 21 being configured as a summing transmission. In the embodiment shown in FIG. 1 main transmission 15 is designed in a basic configuration.

Within first transmission stage 20 input shaft 11 is provided with a step-down stage 25. Step-down stage 25 is configured as a double planetary gear set. A sun gear wheel 26 is seated non-rotatably on input shaft 11. Sun gear wheel 26 meshes with a first planet gear wheel 27 which, in turn, meshes with a second planet gear wheel 28, wherein planet gear wheels 27, 28 are arranged on a common stationary arm 29. Second planet gear train 28 meshes with a ring gear wheel 30.

Ring gear wheel 30 is rigidly connected to a first hollow shaft 35 surrounding input shaft 11 coaxially. For that purpose first hollow shaft 35 is provided with a radial first flange 36.

Hollow shaft 35 is provided with a radial second flange 37 in an axial distance from first flange 36. Flanges 36, 37 support several inclined bearings being distributed over their periphery. In a radial inward position of first flange 36 first inclined bearings 38a, 38b are located and, in an outwardly radial position on second flange 37, second inclined bearings 39a, 39b are located. It is preferred to distribute three such bearings 38, 39 each at equal distances around the periphery of flanges 36, 37.

Bearings 38a, 38b, 39a, 39b rotatably seat shafts 41a, 41b which, in turn, support friction cones 40a, 40b. Friction cones 40a, 40b, hence, rotate rigidly with first hollow shaft 35. However, friction cones 40a, 40b are rotatably journalled within bearings 38a, 38b, 39a and 39b for loose rotation.

The right end free end of shafts 41a, 41b are non-rotatably provided with one beveled gear wheel 45a, 45b each. Beveled gear wheels 45a, 45b mesh with a common beveled gear wheel 46 being seated on a second hollow shaft 47. Second hollow shaft 47, too, extends coaxially with respect to input shaft 11 and is arranged axially adjoining first hollow shaft 35.

As one can clearly see from FIG. 1, bearings 38a, 38b, 39a, 39b are arranged on flanges 36, 37 such that shafts 41a, 41b together with the axial direction of input shaft 11 and hollow shafts 35, 37 respectively, define an acute angle $\alpha$. As angle $\alpha$ is exactly half the taper angle of friction cones 40a, 40b, the outer surface line 49a, 49b of friction cones 40a, 40b extends exactly parallel to the axial direction of shafts 11, 35 and 47.

A friction ring 40 surrounds friction cone 40a, 40b. On its inner surface friction ring 50 is provided with a rolling surface 51. Rolling surface 51 is preferably configured as an annular knife edge of steel and contacts each of the friction cones 40a, 40b, being also preferably made from steel, in a contact point 52, via an oil film such that a so-called elasto-hydrodynamic lubrication (EHS) is established. The oil is supplied by an appropriate angular nozzle (not shown). Contact point 52, however, may also be a short axial contact line, if surface 51 partially extends axially.

Friction ring 50 is configured non-rotatably. It may, however, be displaced in the axial direction of shafts 11, 35 and 47. An actuator 53 is provided for effecting displacement, actuator 53 being displaceable in the aforementioned direction, as indicated by an arrow 54. Actuator 53 is controlled in its displacement movement via a control input 55.

A contact pressure force control may be provided within friction cones 40a, 40b, as indicated at 57 for setting in the contact points 52 a contact force which may be constant or depending on the speed or depending on torque.

Figure 2:
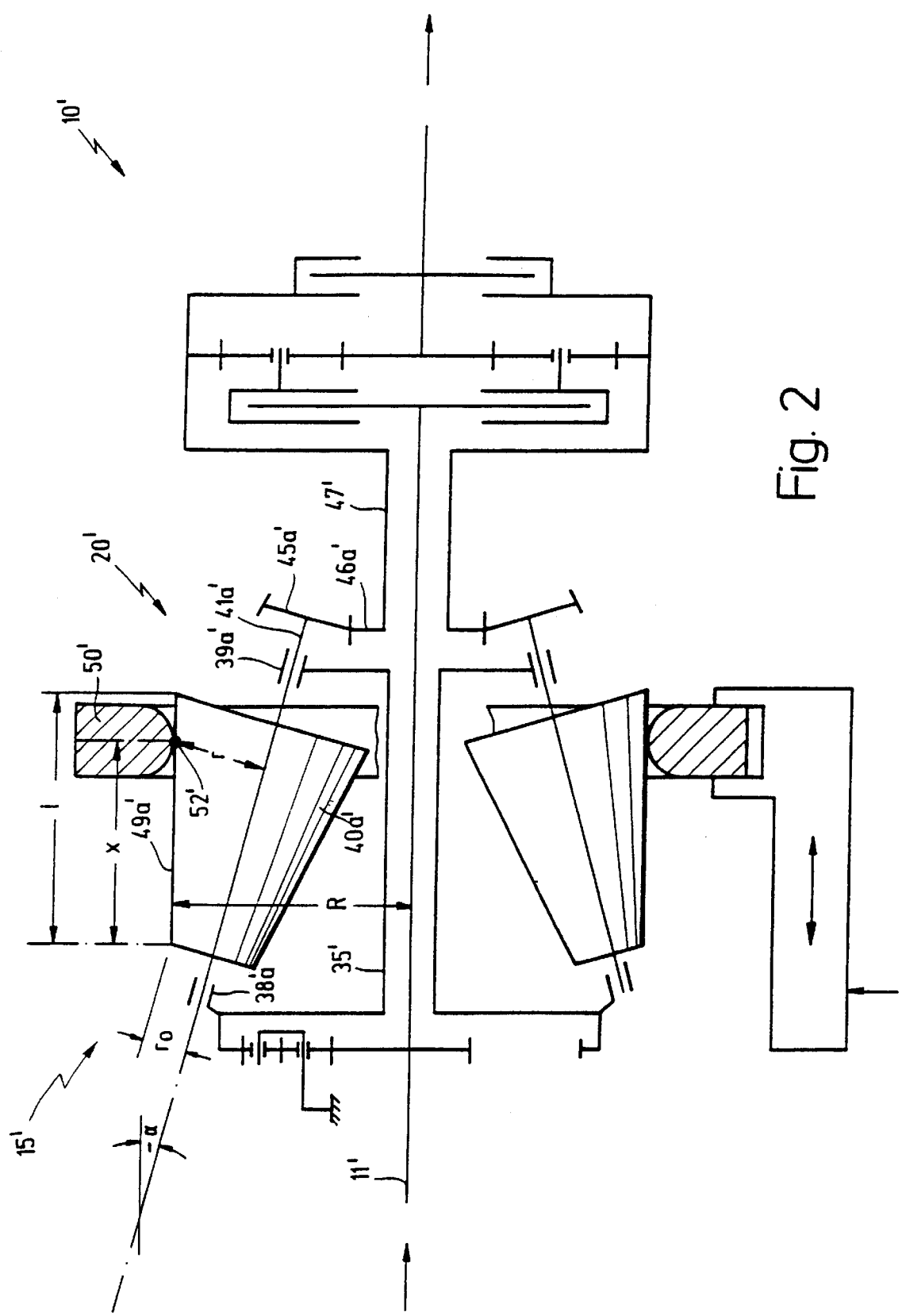
FIG. 2 is a representation, similar to that of FIG. 1, however, for a slight modification of the embodiment shown.

At this instance reference may be made to FIG. 2 where as slightly modified embodiment is depicted. Like reference numerals are indicated by the addition of an apostrophe.

In the modified embodiment of FIG. 2 one can see that shafts 41a' are inclined with respect to the direction of the axis in an opposite sense, as indicated by the angle $-\alpha$. Bearings 38a' and 39a' are, hence, located at radially opposite positions, as compared to the positions of the bearings 38a and 39a in FIG. 1.

Further, one might arrange the friction cones such that the friction ring is located in between the friction cones and not surrounding the friction cones. In that case the outer surface line being parallel to the axis would lie at the inside and not at the outside.

FIG. 1, further, shows the geometrical values of interest in this connection and defining the transmission ratio $i_R$ of the friction cone arrangement.

On friction cone 40*a* the smaller radius of the cone at its tip end is supposed to be $r_0$. At the point 52 of contact the radius is assumed to be r. The point 52 of contact has a distance x from the tip end of friction cone 40*a* on the outer surface line, the entire length thereof being l. The distance of the outer surface line 49*a* from the axis of a shaft 11 is assumed to be R. From these geometrical values the transmission ratio $i_R$ may be given by the following equation:

$$i_R = r/R = (r_0 + x \sin \alpha)/R$$

If, therefore, friction ring 50 is displaced along length l, the transmission ratio range of the friction wheel transmission is determined by the limiting values x=0 and x=l.

Now, the second transmission stage 21 is arranged behind first transmission stage 20 and is configured as a summing transmission, as already mentioned. In the depicted embodiment of FIG. 1 the summing transmission is designed as a simple planetary gear set 60. Planetary gear set 60 is of conventional design and comprises a sun gear wheel 61, planet gear wheels 62 as well as a ring gear wheel 63. Planet gear wheels 62 are seated on a common arm 66.

First clutch 67 connects the right side free end of input shaft 11, extending through hollow shafts 35 and 47, with arm 66, when first clutch 67 is closed.

Ring gear wheel 63 of planetary gear set 60 is provided with a radial flange 68 terminating into a second clutch 69. Second clutch 69 is used to interconnect flange 68 and, hence, ring gear wheel 63 with output shaft 13 as soon as second clutch 69 is closed. Ring gear wheel 63, further, is connected non-rotatably with second hollow shaft 47 via another flange. Output shaft 13 is, further, rigidly connected with sun gear wheel 61. The speed of output shaft 13 is indicated in FIG. 1 by $n_4$.

Figure 3:
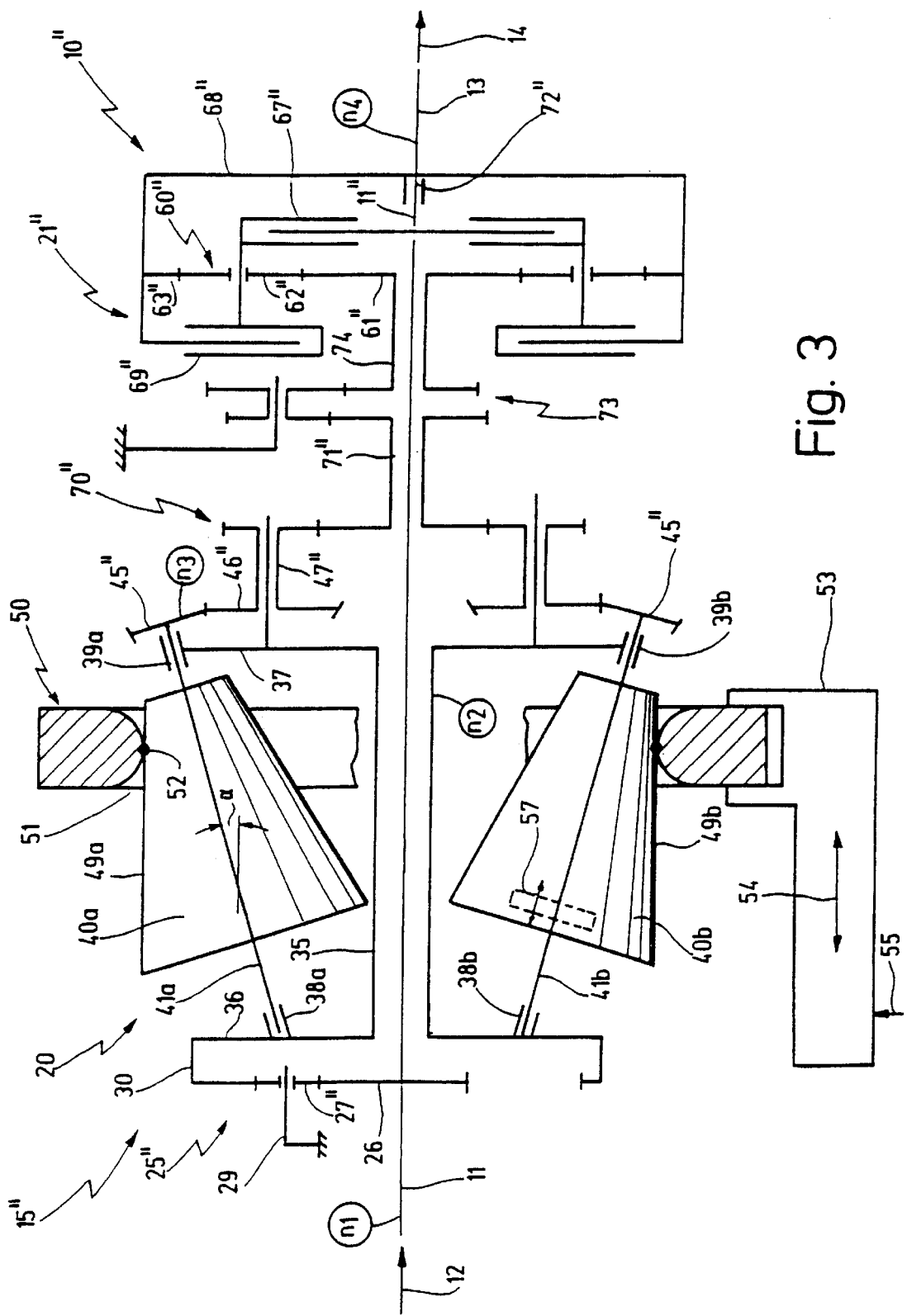
FIG. 3 is a representation, similar to that of FIG. 1, however, for a second slight modification of the embodiment shown.

FIG. 3 shows another modification of the transmission according to FIG. 1. Like elements are designated with like reference numerals, however, are identified by adding a double apostrophe. Modifications are provided with respect to the design of the step-down stage 25 and 25", respectively, as well a with respect to second transmission stage 21 and 21", respectively.

In the transmission of FIG. 3 a further additional transmission stage 73 is used as well as modifications in the transmission ratios of the elementary transmission stages. By doing so the transmission may be adapted. The additional transmission stages 25", 73 and a gear wheel set 70" together with the first transmission stage 20 configure the main transmission 15 in that case.

In the transmission 10" of FIG. 3 the step-down stage 25" is configured with inverted sign. This means that only one planet gear 27" is provided within the planetary gear set. The revolutional speed is, hence, inverted.

Another modification consists in that second hollow shaft 47" is connected to a second gear wheel set 70" being located behind the first transmission stage. In gear wheel set 70" the arm of the planetary gear set is connected with the arm of the first transmission stage 20. The planet gear wheels 46" drive another hollows shaft 71". By doing so, a fixed transmission ratio is set.

Hollow shaft 71" acting as output of this planetary gear set, however, is connected to a gear step 73 arranged in front of second transmission stage 21" and having the design of a double planetary gear set. In the latter the arm is held stationary. Another hollow shaft 74 is configured as the output of this double planetary gear set.

Hollow shaft 74 drives sun gear wheel 61" of planetary gear set 60", the planet gear wheel 62" of which being held by an arm which, on the one hand side, adjoins first clutch 67" and, on the other hand side, second clutch 69". The other input of first clutch 67" is connected to input shaft 11". The other input of second clutch 69" is connected to output shaft 13 via flange 68". Input shaft 11" in this embodiment is journalled colinearly to output shaft 13 in flange 68" by means of a bearing 72".

In FIG. 3 main transmission 15" consists of the planetary gear sets 20, 25" and 73" as well as of gear wheel set 70". Planetary gear set 60" does not belong to main transmission 15" but to second transmission stage 21" instead.

Figure 4:
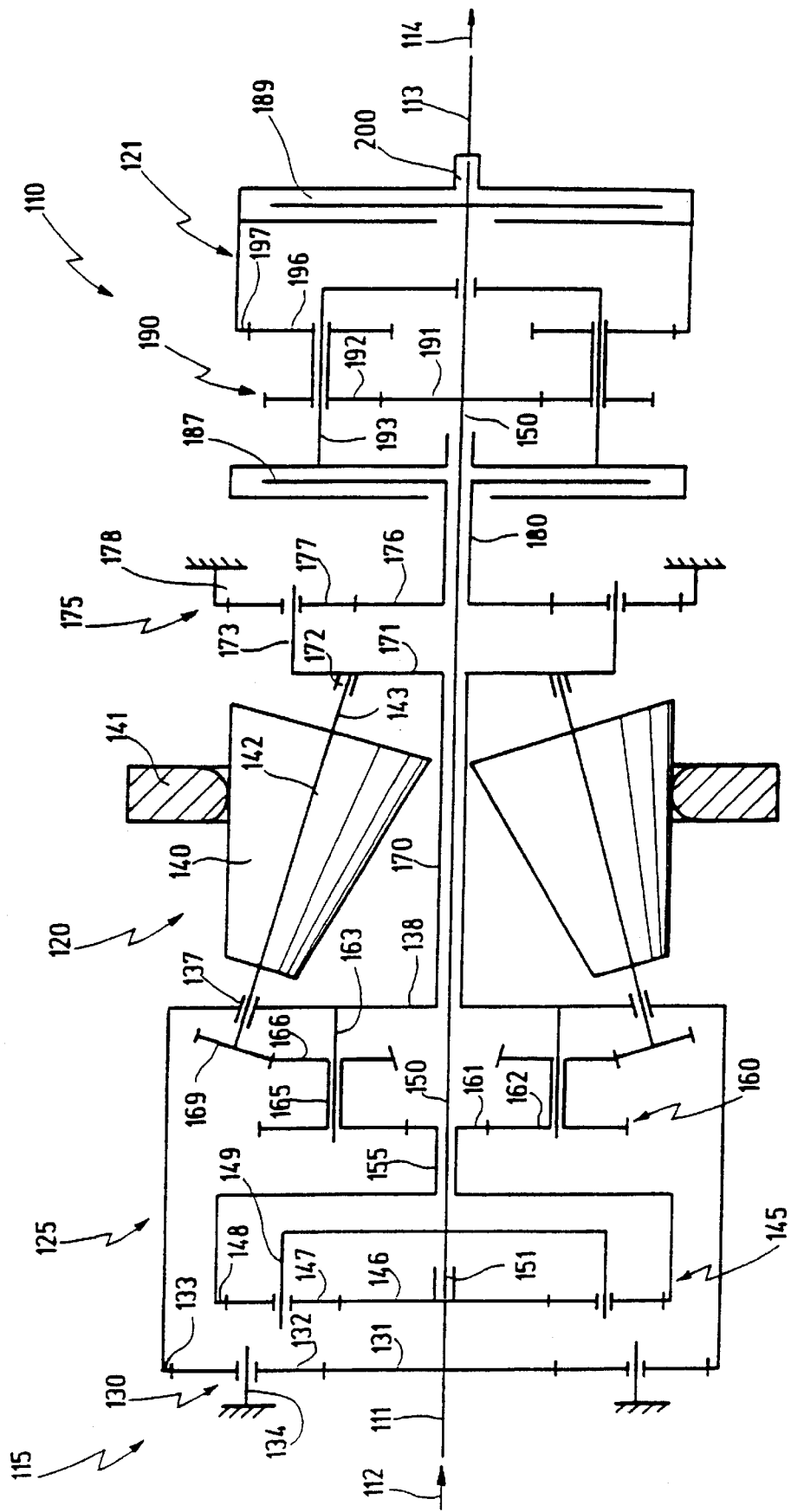
FIG. 4 is a further representation, similar to that of FIG. 1, however, for a third modification of the embodiment shown.

Transmission 110 shown in FIG. 4 has an input shaft 111 for feeding input power to transmission 110, as indicated by an arrow 112. At the output of transmission 110 an output shaft 113 may be seen from which output power may be taken as indicated with an arrow 114.

Transmission 110, too, is subdivided into a first transmission stage 120 having a continuously variable transmission ratio, as well as into a second transmission stage 121, operating as a summing transmission.

A step-down stage 125 is arranged in front of first transmission stage 120.

Input shaft 111 drives a first planetary gear set 113, namely sun gear wheel 131 of the latter. First planetary gear set 130, further, comprises planet gear wheels 132 as well as a ring gear wheel 133. An arm 134 of planet gear wheels 132 is held stationary.

Ring gear wheel 133 carries bearings 137 for first transmission stage 120. For that purpose ring gear wheel 133 terminates into a radial flange 138 at its right hand terminal end in FIG. 4.

First transmission stage 120, again, comprises friction cones 140 cooperating with a friction ring 141, as already explained. The axes of friction cones 140 are designated with 142. A shaft 143 protrudes at the ends of friction cones 140, shaft 143 extending along axis 142. The left hand terminal end of shaft 143 is journalled within bearing 137, already mentioned.

Input shaft 111, further, drives a second planetary gear set 145, namely the sun gear wheel 146 of the latter. Second planetary gear set 145, further, has planet gear wheels 147 as well as a ring gear wheel 148. The arm 149 of planet gear wheels 147 drives an intermediate shaft 150. In FIG. 4, the left hand side terminal end of intermediate shaft 150 is journalled in a bearing 151 being an extension of input shaft 111.

Ring gear wheel 148 of second planetary gear set 145 drives a hollow shaft 155 surrounding intermediate shaft 150 coaxially. Hollow shaft 155 is connected to a third planetary gear set 160, i.e. the sun gear wheel 161 of the latter.

Third planetary gear set 160 is configured as a four-wheel planetary gear set having two axially distant gear wheel sets. Sun gear wheel 161 meshes with first planet gear wheels 162 being seated on an arm 163. For that purpose first planet gear wheels 162 are arranged on hollow shafts 165.

Hollow shafts 165, further, support second planet gear wheels 166 being configured as beveled gears. Planet gear wheels 166, in turn, mesh with toothed gear wheels 169 which are non-rotatably arranged on the left hand terminal end of shafts 143 of friction cones 140.

Radial flange 138 of ring gear wheel 133 of the first planetary gear set 130 is connected with another hollow shaft 170 which also coaxially surrounds intermediate shaft 150. Further hollow shaft 170 extends beyond the length of friction cones 140 and carries a radial flange at its right hand terminal end (FIG. 4) being provided with bearings 172 for the right hand free ends of shafts 143. The periphery of flange 171 constitutes an arm 173 for a fourth planetary gear set 175.

Fourth planetary gear set 175 comprises a sun gear wheel 176, planet gear wheels 177 as well as a ring gear wheel 178. Ring gear wheel 178 is held stationary. Sun gear wheel 176 is connected to still another hollow shaft 180 which also coaxially surrounds intermediate shaft 150. Hollow shaft 180 is connected to the inner plates of first clutch 187 (one of which only being shown in FIG. 4). First clutch 187 is part of the second transmission stage 121 which also comprises a second clutch 189.

The summing transmission of second transmission stage 121 as such is configured by a fifth planetary gear set 190 consisting of a sun gear wheel 191, planet gear wheels 192 and 196 as well as an arm 193. Further, a ring gear wheel 197 belongs thereto.

As one can easily see, arm 193 is connected with the outer plates of first clutch 187.

The sun gear wheel 191 of fifth planetary gear set 190 is driven by the intermediate shaft 150. Ring gear wheel 197 is rigidly connected with the outer plate of second clutch 189. The inner plate thereof is non-rotatably connected with intermediate shaft 150.

Finally, one can see that the right hand free end of intermediate shaft 150 is journalled in a bearing 200 being arranged as an extension of output shaft 113.

In the transmission 110 of FIG. 4 the first transmission stage 120 configures the variator, as mentioned before. The second transmission stage 121, as also mentioned above, configures a summing transmission. The main transmission 115 comprises the planetary gear sets 120, 130, 145, 160 and 174. Planetary gear train 190 is associated to the summing transmission.

A third transmission stage is represented by the first planetary gear set 130 operating as a reduction set. A fourth transmission stage being configured by the third planetary gear set 160 operates as a coupling set. A fifth transmission stage is configured by the fourth planetary gear train 175, operating as an intermediate set. A sixth transmission stage consists solely of the second planetary gear set 145, operating as a power divider set. Such intermediate set and power divider set is not provided in the embodiments of FIGS. 1 to 3 and 32.

The intermediate set is driven at its input with the input speed of the first transmission stage 120 and the output speed of the third transmission stage 130, respectively, and its output is connected to first clutch 187.

The power divider set, however, has three connectors, a first of which being connected with the input shaft 111, a second of which being connected with the output of the first transmission stage 120 and a third of which being connected to the second clutch 189.

The power divider set effects a power division of input power in the direct mode of operation as well as a division of reactive power feedback in the load mode of operation. The flow of power over the variator is determined by the value of transmission ratio of the divider set. The latter also effects that in synchronization the fraction of power flowing through the variator is between 20% and 60% of the reactive power or the input power, preferably about 22.9%.

Figure 5:
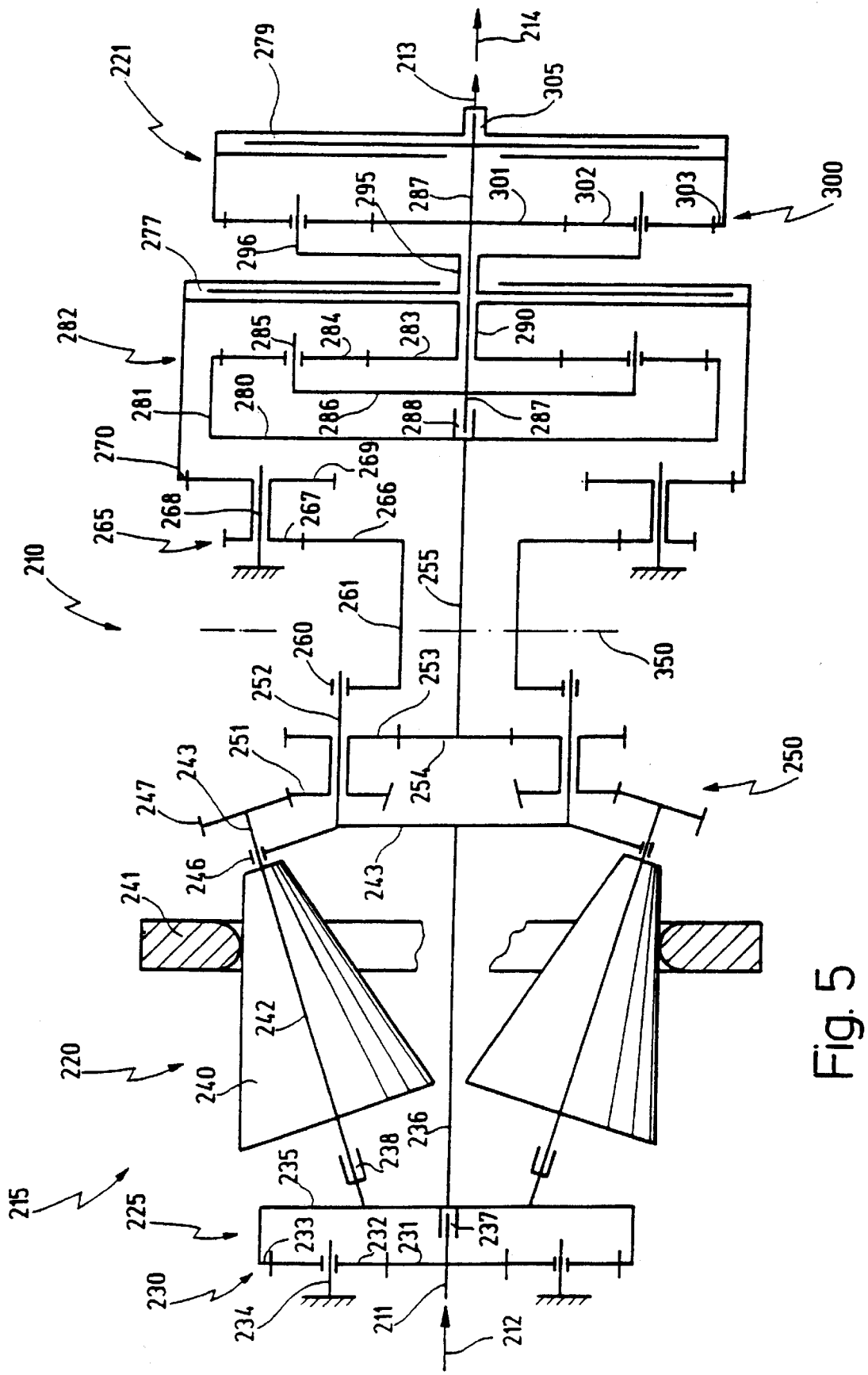
FIG. 5 is a further representation, similar to that of FIG. 1, however, for a fourth modification of the embodiment shown.

FIG. 5, finally, shows still another transmission 210 with an input shaft 211 to which power may be fed along an arrow 212. From output shaft 213 power may be taken in the direction of an arrow 214. Transmission 210, again, has a first transmission stage 220 as well as a second transmission stage 221. A step-down stage is indicated with 225.

The step-down stage 225 is configured by a planetary gear set 230. Planetary gear met 230 comprises a sun gear wheel 231, planet gear wheels 232 as well as a ring gear wheel 233. A common arm 234 of planet gear wheels 232 is held stationary.

A radial flange 235 of ring gear wheel 233 extends to a first intermediate shaft 236. First intermediate shaft 236 extends in extension of input shaft 211 and is journalled in the latter by means of a bearing 237. Flange 235, further, supports another bearing 2238 for friction cones 240 of first transmission stage 220. Friction cones 240, again cooperate with a friction ring 241. The axes of friction cone 240 are designated with 242 and their shafts with 243. A radial flange 245 being arranged at the right hand side end of first intermediate shaft 236 in FIG. 5 carries another bearing 246 for friction cones 240. The right hand free ends of shafts 243 are provided with toothed wheels 247.

As one can easily see by a comparison of FIGS. 4 and 5, friction cones 140 and 240, respectively, are oriented oppositely because the output toothed wheels 169 of friction cones 140 are directed towards the input shaft 111 in FIG. 4, whereas FIG. 5 shows an arrangement where the output toothed wheels 247 of friction cones 240 are directed towards output shaft 213.

Accordingly, whereas in transmission 110 of FIG. 4 the flow of power is directed from the output of first transmission stage 120 to the left hand side (via third planetary gear train 160) and then back to the right hand side (via second planetary gear train 145), FIG. 5 with its transmission 210 presents an arrangement where the main flow of power as a whole essentially flows from left to right.

Toothed wheels 247 are connected to planetary gear set 250 being configured as a double planetary gear train and corresponding, insofar, to third planetary gear train 160 (coupling set) of FIG. 4. Planetary gear train 250 comprises first planet gear wheels 251 being configured as beveled gear wheels, a common arm 252 as well as second planet gear wheels 253, meshing with a sun gear wheel 254.

Sun gear wheel 254 is connected with a second intermediate shaft 255 extending colinearly to first intermediate shaft 236.

Common arm 252 rotating together with carrier 235, 236 and 245 of friction cone 240 is provided with bearings 260 at its right hand terminal end in FIG. 5. Bearings 260 are connected with a hollow shaft 261 via a radial flange. Hollow shaft 261 surrounds second intermediate shaft 255 coaxially.

Hollow shaft 261 is connected to a planetary gear set 265, corresponding to fourth planetary gear set 175 (intermediate set) of FIG. 4. Planetary gear set 265 is also configured as a four-wheel planetary gear set. It comprises a sun gear wheel 266 as well as first planet gear wheels 267 meshing therewith, a common arm 268 and further planet gear wheels 269 meshing with a ring gear wheel 270.

Ring gear wheel 270 is connected with an outer plate of a first clutch 277 which, as well as a second clutch 279 belongs to second transmission stage 221.

The right hand free terminal end of second intermediate shaft 155 in FIG. 5 supports a radial flange 280 which, concurrently, is the ring gear wheel 281 of a planetary gear set 282.

Planetary gear set 282 corresponds to second planetary gear set 145 (power divider set) in FIG. 4.

Planetary gear set 282 comprises a sun gear wheel 283, planet gear wheels 284 as well as an arm 285.

Arm 285 is connected with a third intermediate shaft 287 via a radial flange 286. Intermediate shaft 287 also extends colinearly to shafts 236 and 255. Its left hand terminal end in FIG. 5 is journalled in a bearing 288 as an extension of second intermediate shaft 255.

Sun gear wheel 283 of planetary gear set 282 is connected to a hollow shaft 290 which also is connected to the outer plate of first clutch 277.

Another hollow shaft 295 extending colinearly to hollow shaft 290 and also coaxially surrounding third intermediate shaft 287 interconnects the inner plate of first clutch 277 with the arm 296 of a planetary gear set 300.

Planetary gear set 300 corresponds to the fifth/sixth planetary gear set 190 and the second transmission stage (summing transmission) in FIG. 4, respectively.

Planetary gear set 300 comprises a sun gear wheel 301, a planet gear wheel 302 as well as a ring gear wheel 303. Sun gear wheel 301 is non-rotatably seated on third intermediate shaft 287. Ring gear wheel 303 is connected to the outer plate of second clutch 279. The inner plate thereof is non-rotatably seated on third intermediate shaft 287. The right hand free terminal end of third intermediate shaft 287 in FIG. 5 is journalled in a bearing 305 being an axial extension of output shaft 213.

The main transmission 215 comprises the planetary gear sets 220, 230, 250, 265 and 282. Planetary gear set 300 is associated to the summing transmission.

As already mentioned, transmission 210 of FIG. 5 essentially and functionally corresponds to transmission 110 of FIG. 4. In both transmissions the respective first transmission stage 120/220 is provided as a transmission with continuously variable transmission ratio. A second transmission stage 121/221 serves as a summing transmission. A third transmission stage 130/230 serves as a reduction set. A fourth transmission stage 160/250 is configured as a coupling set. A fifth transmission stage 175/265 serves as an intermediate set, and a sixth transmission stage 145/282 is configured as a power divider set.

In all of the afore-described embodiments the configuration is such that the respective main transmission as well as the respective second transmission stage extend coaxially in itself as well as with respect to another along a common main axis. This embodiment of the transmission according to the invention is, therefore, particularly suited for such cases where the transmission is installed along the longitudinal direction of the vehicle. In those cases the longitudinal dimensions of the transmission are not a critical factor.

If, however, the transmission is to be installed transversely to the longitudinal direction of the vehicle, in particular in the so-called transverse-front-drives, it may be suitable to select another embodiment.

In FIG. 5 reference numeral 350 indicates a dash-dot line intersecting shaft 255 and hollow shaft 261.

One can dissect the transmission 210 along this plane and then arrange the two transmission halves, thus generated, one next to the other and, preferably, parallel with their axes. For example, that portion of transmission 210 in FIG. 5 that is on the left hand side of dash-dot line 350 may be symmetrically rotated about the axis of line 350 and may be shifted downwardly. The free ends of shafts 255 and 261 could then be interconnected by means of appropriate gear sets. In such a way a transmission would be designed having about half the axial length.

I claim:

1. A motor vehicle transmission having a continuously variable transmission ratio and comprising a transmission input shaft, a transmission output shaft, a first transmission stage with an input, an output, and having a continuously variable transmission ratio, and a second transmission stage configured as a summing transmission, the transmission input shaft being connected on the first side of the transmission input shaft with the input of the first transmission stage and on the second side of the transmission input shaft via a first clutch with a first input of the second transmission stage, the output of the first transmission stage, further, being connected on the first side of the output of the first transmission stage with a second input of the second transmission stage and, on the second side of the output of the first transmission stage via a second clutch with the transmission output shaft constituting also the output of the second transmission stage, wherein the first transmission stage is a part of a main transmission and the main transmission and the second transmission stage are arranged coaxial to each other and coaxial relative to a common main axis.

2. The transmission of claim 1, wherein the first transmission stage is configured as a friction wheel epicyclic transmission in which two bodies contact each other in an area under friction, the friction body transmission being dimensioned such that the friction bodies rotate at a higher rotational speed ($n_3$) as compared to the rotational speed ($n_1$) of the transmission input shaft over the entire transmission ratio range.

3. A motor vehicle transmission having a continuously variable transmission ratio and comprising a transmission input shaft, a transmission output shaft, a first transmission stage with an input, an output, and having a continuously variable transmission ratio, and a second transmission stage operating as a summing transmission, the transmission input shaft being connected on the first side of the transmission input shaft with the input of the first transmission stage and on the second side of the transmission input shaft via a first clutch with a first input of the second transmission stage, the output of the first transmission stage, further, being connected on the first side of the output of the first transmission stage with a second input of the second transmission stage and, on the second side of the output of the first transmission stage via a second clutch with the transmission output shaft constituting also the output of the second transmission stage, the first transmission stage being configured as a friction wheel epicyclic transmission in which two bodies contact each other in an area under friction, wherein the friction bodies rotate at a higher rotational speed ($n_3$) as compared to the rotational speed ($n_1$) of the input shaft over the entire transmission ratio range.

4. The transmission of claim 3, wherein the main transmission and the second transmission stage are arranged coaxial to each other and coaxial relative to a common main axis.

5. The transmission of claim 3, wherein the main transmission and the second transmission stage are each configured coaxially but are arranged on two main axes being parallel to each other.

6. The transmission of claim 1, wherein the first transmission stage is configured as an epicyclic transmission.

7. The transmission of claim 1, wherein the second transmission stage (21; 121; 221) consists solely of a three-shaft planetary gear train.

8. The transmission of claim 1, wherein the first transmission stage has a transmission ratio that can be adjusted continuously between 0.1 and 0.7.

9. The transmission of claim 8, wherein the range is between 0.162 and 0.457.

10. The transmission of claim 8, wherein the range is between 0.17 and 0.42.

11. The transmission of claim 2, wherein the transmission further comprises a third transmission stage transforming speed into slower speed and operating as a reducing gear set, the third transmission is arranged in front of the friction body transmission within the main transmission and converts the input speed ($n_1$) of the transmission input shaft into a slower intermediate speed.

12. The transmission of claim 11, wherein the third transmission stage has a transmission ratio of between +1.5 and +3.5.

13. The transmission of claim 11, wherein the third transmission stage has a transmission ratio of between −1.5 and −3.5.

14. The transmission of claim 1, wherein the third transmission stage is a planetary gear set, preferably determining a synchronization point through a corresponding transmission of an intermediate gear set.

15. The transmission of claim 14, the transmission further comprising a sun gear wheel, wherein power is fed to the planetary gear set via the sun gear wheel.

16. The transmission of claim 14, wherein the planetary gear set includes an arm held stationary when power is held to the planetary gear set.

17. The transmission of claim 14, wherein the planetary gear set includes a ring gear wheel, wherein power is fed from the ring gear wheel to the first transmission stage.

18. The transmission of claim 1, wherein within the main transmission the output of the first transmission stage may be connected with the second input of the second transmission stage via a fourth transmission stage operating as a coupling set.

19. The transmission of claim 18, wherein the fourth transmission stage converts speed into slower speed.

20. The transmission of claim 18, wherein the fourth transmission stage converts speed into faster speed.

21. The transmission of claim 18, wherein the fourth transmission stage has a transmission ratio of between −1.2 and −2.8.

22. The transmission of claim 18, wherein the fourth transmission stage has a transmission ratio of between +0.5 and +2.0, preferably about +1.2434 or +1.435.

23. The transmission of claim 1, wherein the first transmission stage comprises a shaft to which at least one friction cone is arranged such that its axis is inclined with respect to the shaft by half the taper angle $\alpha$ of the friction cone, the friction cone being rotatable about its axis, that a is arranged coaxially with respect to the shaft such that it frictionally contacts the outer surface line parallel to the shaft in an area and being displaceable in the direction of the shaft, such that the area wanders along the outer surface line, and that the rotational speed of the friction cone may be taken as the output speed of the first transmission stage via a sun gear wheel.

24. The transmission of claim 23, wherein a toothed wheel is directed towards the output shaft, the toothed wheel being non-rotatably connected to the friction cone.

25. The transmission of claim 23, wherein a toothed wheel is directed towards the input shaft, the toothed wheel being non-rotatably connected to the friction cone.

26. The transmission of claim 23, wherein the shaft supporting the at least one friction cone is configured as a first hollow shaft, a sun gear wheel being seated on a second hollow shaft, the transmission input shaft extending through the hollow shafts, being flush with each other.

27. The transmission of claim 23, wherein the half taper angle $\alpha$ is between 10° and 20°.

28. The transmission of claim 23, wherein the friction cone is provided with a torque-dependent controller for setting the contract pressure force within the area.

29. The transmission of claim 1, wherein the second transmission stage is adapted to effect as a summing set and in a load mode of operation a feedback of reactive power flowing through the first transmission stage.

30. The transmission of claim 7, the planetary gear train includes an arm, wherein a first connection shaft is configured by the arm of the planetary gear train, and is connected with a constant output of the main transmission.

31. The transmission of claim 7, wherein a second connection shaft is configured by a ring gear wheel of the planetary gear train, and is connected with a variable output of the main transmission.

32. The transmission of claim 7, wherein a second connection shaft is configured by a sun gear wheel of the planetary gear train, and is connected with the transmission output shaft.

33. The transmission of claim 29, wherein the planetary gear set has a transmission ratio of between −0.2 and −0.65.

34. The transmission of claim 29, wherein the planetary gear set has a transmission ratio of between −1.5 and −3.0.

35. The transmission of claim 29, wherein the planetary gear set has a transmission ratio of between +1.25 and +3.0.

36. The transmission of claim 29, wherein the planetary gear set has a transmission ratio of between +0.2 and +0.6.

37. The transmission of claim 1, wherein a fifth transmission stage acting as an intermediate gear set, is configured as a planetary gear set and is arranged within the main transmission.

38. The transmission of claim 37, wherein the fifth transmission stage is driven at its input with the input speed of the first transmission stage, and that its output is connected with the first clutch.

39. The transmission of claim 37, wherein one of the elements of the planetary gear set is held stationary.

40. The transmission of claim 39, wherein the element is a ring gear wheel.

41. The transmission of claim 37, wherein a first connection shaft of the fifth transmission stage is connected with the transmission input shaft either directly or via constant transmission ratios.

42. The transmission of claim 37, wherein a first connection shaft of the fifth transmission stage is connected with the output of the fourth transmission stage.

43. The transmission of claim 37, wherein a second connection shaft of the fifth transmission stage is connected with the first clutch.

44. The transmission of claim 39, wherein the planetary gear set has a transmission ratio of between −0.8 and −0.2.

45. The transmission of claim 39, wherein the planetary gear set has a transmission ratio of between +0.6 and +0.2.

46. The transmission of claim 39, wherein the element is an arm.

47. The transmission of claim 39, wherein a first connection shaft of the fifth transmission stage is connected with the input of the first transmission stage.

48. The transmission of claim 46, wherein the planetary gear set has a transmission ratio of between −1.3 and −4.0.

49. The transmission of claim 46, wherein the planetary gear set has a transmission ratio of between +1.7 and +4.0.

50. The transmission of claim 1, wherein a sixth transmission stage, acting as a power dividing set, is arranged within the main transmission and is configured as a three-shaft planetary gear set.

51. The transmission of claim 50, wherein a first connection shaft of the sixth transmission stage is connected with the input shaft.

52. The transmission of claim 50, wherein a second connection shaft of the sixth transmission stage is connected with the output of the fourth or the fifth transmission stage arranged behind the first transmission stage.

53. The transmission of claim 50, wherein a third connection shaft of the sixth transmission stage is connected with the second clutch.

54. The transmission of claim 50, wherein the sixth transmission stage has a transmission ratio of between −1.5 and −3.5.

55. The transmission of claim 50, wherein the sixth transmission stage has a transmission ratio of between +1.5 and +4.0.

56. The transmission of claim 50, wherein the sixth transmission stage acts as a dividing set effecting a power division in a load mode of operation and a direct mode of operation, respectively, such that in a synchronized state between 20% and 60% of the drive power flow through the first transmission stage.

57. The transmission of claim 50, wherein the sixth transmission stage has a transmission ratio of between −1.5 and −3.5.

58. The transmission of claim 50, wherein the sixth transmission stage has a transmission ratio of between +1.5 and +4.0.

59. The transmission of claim 3, wherein the first transmission stage is configured as an epicyclic transmission.

60. The transmission of claim 3, wherein the second transmission stage consists solely of a three-shaft planetary gear train.

61. The transmission of claim 3, wherein the first transmission stage has a transmission ratio that can be adjusted continuously between 0.1 and 0.7.

62. The transmission of claim 3, wherein a third transmission stage transforming speed into lower speed and operating as a reducing gear set, is arranged in front of the friction body transmission within the main transmission, and converts an input speed (n1) of the transmission into a slower intermediate speed.

63. The transmission of claim 3, wherein the third transmission stage is a planetary gear set.

64. The transmission of claim 3, wherein within the main transmission the output of the first transmission stage may be connected with the second input of the second transmission stage via a fourth transmission stage operating as a coupling set.

65. The transmission of claim 3, wherein within the main transmission the output of the first transmission stage may be connected with the second input of the second transmission stage via a fourth transmission stage operating as a coupling set.

66. The transmission of claim 3, wherein the second transmission stage is adapted to effect as a summing set and in a load mode of operation a feedback of reactive power flowing through the first transmission stage.

67. The transmission of claim 3, wherein a fifth transmission stage acting as an intermediate gear set, is configured as a planetary gear set and is arranged within the main transmission.

68. The transmission of claim 3, wherein a sixth transmission stage, acting as a power dividing set, is arranged within the main transmission and is configured as a three-shaft planetary gear set.

69. The transmission of claim 8, wherein the transmission ratio can be adjusted continuously between 0.2 and 0.4.

70. The transmission of claim 12, wherein the transmission ratio is 2.07692.

71. The transmission of claim 13, wherein the transmission ratio is between −1.90 and −2.24.

72. The transmission of claim 21, wherein the transmission ratio is −2.32143.

73. The transmission of claim 23, wherein the friction ring is non-rotational.

74. The transmission of claim 23, wherein the area is a point.

75. The transmission of claim 27, wherein the half taper angle α is 17°.

76. The transmission of claim 29, wherein the feedback of reactive power comprises between 40% and 75% of the drive power within a synchronized state.

77. The transmission of claim 76, wherein the feedback of reactive power comprises 48% of the drive power within the synchronized state.

78. The transmission of claim 30, wherein the first connection shaft is a first input of the second transmission stage.

79. The transmission of claim 31, wherein the second connection shaft is a second input of the second transmission stage.

80. The transmission of claim 32, wherein the second connection shaft is a second input of the second transmission stage.

81. The transmission of claim 33, wherein the transmission ratio is between −0.43859 and −0.294.

82. The transmission of claim 34, wherein the transmission ratio is −1.731.

83. The transmission of claim 35, wherein the transmission ratio is +1.32.

84. The transmission of claim 41, wherein the first connection shaft is an arm of the fifth transmission stage.

85. The transmission of claim 42, wherein the first connection shaft is a sun gear wheel of the fifth transmission stage.

86. The transmission of claim 43, wherein the second connection shaft is a sun gear wheel of the fifth transmission stage.

87. The transmission of claim 44, wherein the transmission ratio is −0.495.

88. The transmission of claim 45, wherein the transmission ratio is +0.495.

89. The transmission of claim 47, wherein the first connection shaft is a sun gear wheel of the fifth transmission stage.

90. The transmission of claim 48, wherein the transmission ratio is −1.3153.

91. The transmission of claim 49, wherein the transmission ratio is +1.7.

92. The transmission of claim 51, wherein the first connection shaft is a sun of the sixth transmission stage.

93. The transmission of claim 52, wherein the second connection shaft is a ring wheel gear of the sixth transmission stage.

94. The transmission of claim 53, wherein the third connection shaft is an arm of the sixth transmission stage.

95. The transmission of claim 54, wherein the transmission ratio is −2.0526.

96. The transmission of claim 56, wherein in the synchronized state between 32.2% and 55.9% of the drive power flow through the first transmission stage.

97. The transmission of claim 57, wherein the transmission ratio is −2.0526.

98. The transmission of claim 61, wherein the transmission ratio can be adjusted continuously between 0.2 and 0.4.

99. The transmission of claim 63, wherein the planetary gear set determines a synchronization point through a corresponding transmission of an intermediate gear set.

100. The transmission of claim 66, wherein the feedback of reactive power comprises between 40% and 75% of the drive power within a synchronized state.

101. The transmission of claim 99, wherein the feedback of reactive power comprises 48% of the drive power within a synchronized state.

* * * * *

UNITED STATES PATENT AND TRADEMARK OFFICE
CERTIFICATE OF CORRECTION

PATENT NO.   : 5,984,820
DATED        : November 16, 2000
INVENTOR(S)  : Horst Josef Wedeniwski Page 1 of 1

It is certified that error appears in the above-identified patent and that said Letters Patent is hereby corrected as shown below:

After the "Inventor" information on the Title page of the Patent, please add the following: "Assignee: GETRAG Innovations GmbH, Ludwigsburg, Germany".

Signed and Sealed this

Twenty-fourth Day of July, 2001

*Attest:*

Nicholas P. Godici

*Attesting Officer*

NICHOLAS P. GODICI
*Acting Director of the United States Patent and Trademark Office*